United States Patent Office 3,353,814
Patented Nov. 21, 1967

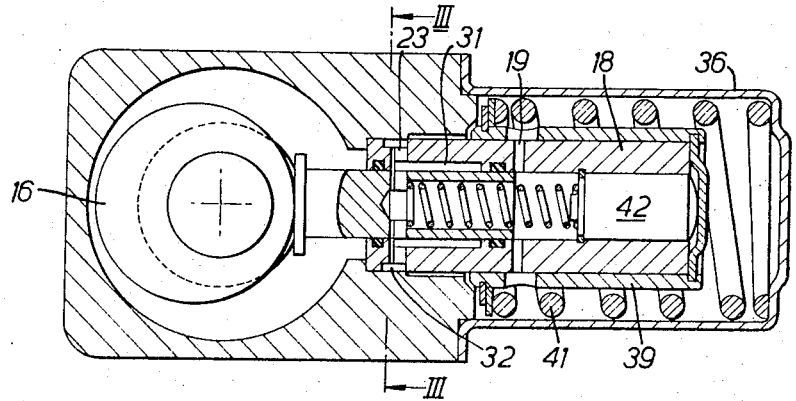
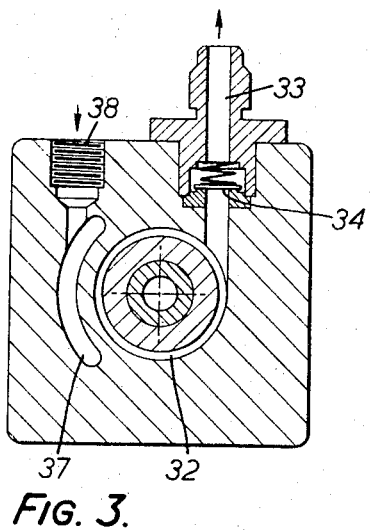
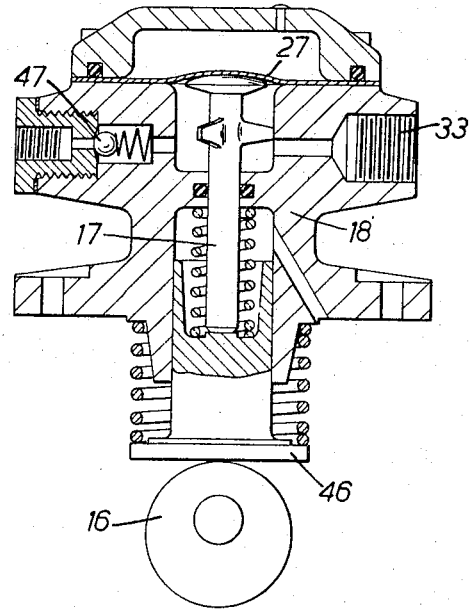

3,353,814
VEHICLE SUSPENSION SYSTEMS AND PUMPS FOR SUCH SYSTEMS
John Robert Rees and Douglas Bryan Wilkins, Birmingham, England, assignors to Girling Limited, Birmingham, England
Filed Oct. 25, 1965, Ser. No. 505,177
Claims priority, application Great Britain, Oct. 24, 1964, 43,448/64
5 Claims. (Cl. 267—64)

This invention relates to vehicle suspension systems of the self-levelling type Such systems include one or more suspension struts to which fluid is supplied when a strut becomes over compressed, and from which fluid is removed when the strut is over extended Various arrangements have been proposed hitherto but have tended to be complicated and expensive to manufacture and install.

The present invention has for its object the provision of a self-levelling suspension system of simplified construction.

In accordance with the invention there is provided a suspension system including a suspension strut provided with inlet and outlet ports and associated valve means normally positioned to close both said ports, the valve means being moved to open the inlet port when the strut is compressed to a predetermined extent, and to open the outlet port when the strut is extended to a predetermined extent, and an independent pump connected to the said inlet for supplying fluid to the strut, the said pump being adapted to store a quantity of pressurised fluid for any period of a working stroke during which the said inlet port is closed.

The pump is preferably constituted by a reciprocating piston pump having a working chamber which is closed by a movable end wall, and resilient means for opposing movement of the end wall under the action of the piston and for storing the energy of the piston The resilient means may take the form of a gas spring or a resilient spring.

The piston of the pump may be arranged to act as a valve controlling the inlet and the outlet of the pump, and if non-return valves are provided for the inlet and outlet of the strut it is possible to arrange that the strut is connected to the pump by a single pipe, the pump itself providing a connection between the strut and a fluid reservoir, thus effecting economy in the number of major components and facilitating installation.

Some embodiments of the invention are described below, by way of example only, with reference to the accompanying drawings, in which:

FIGURE 2 is an axial section of an alternative form of pump;

FIGURE 3 is a section on the line III—III of FIGURE 2;

FIGURE 4 is an axial section of a third form of pump.

Figure 1:
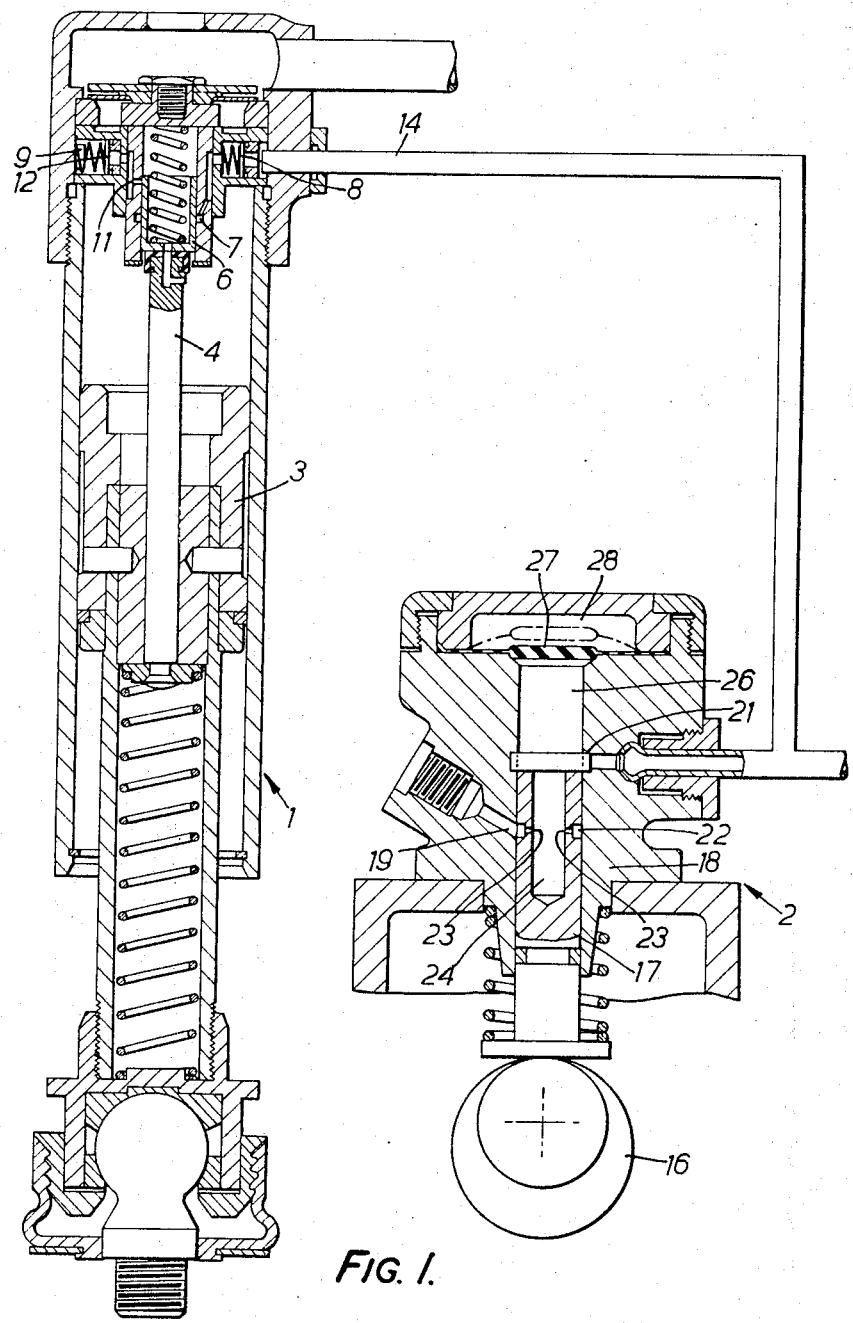
FIGURE 1 is a cross-sectional elevation of a suspension strut and pump in accordance with the invention.

The suspension system shown in FIGURE 1 comprises an hydraulic strut 1 and an hydraulic pump 2. The piston 3 of the strut is provided with an upwardly extending stem 4 for engagement with an axially movable valve spool 6 arranged to control the flow of fluid into and out of the upper portion of the strut. The strut is provided with an inlet port 7 in the form of an annular recess communicating, through a non-return valve 8, with an annular passage 9. An outlet port 11 communicates with the passage 9 through a non-return valve 12. When the strut is between predetermined acceptable limits of extension, the spool 6 covers both ports 7 and 11, as shown. If the strut is compressed to a predetermined extent, the spool valve uncovers the inlet port to allow fluid to enter the strut, and if it is extended to a predetermined extent the valve spool 6 uncovers the outlet port $11_x$ to allow fluid to leave the strut.

The annular passage 9 is connected by a single pipe 14 to the pump 2. The pump is of the reciprocating piston type and is adapted to be operated continuously by an engine driven eccentric 16 engaging a spring loaded piston 17 working in the bore of the pump body 18. The bore is provided axially with spaced inlet and outlet ports 19 and 21, respectively, in relation to which the piston 17 is adapted to act as a valve, the piston being formed with an annular groove 22, and radial bores 23 leading from the groove to an axial recess 24 in the piston. The working space 26 of the pump is closed by a movable end wall in the form of a diaphragm 27 whose area is substantially greater than that of the bore of the pump. The space 28 above the diaphragm is completely enclosed and is filled with air or other gas under pressure.

In operation of the pump, assuming the inlet port 7 of the strut to be open, the sequence of events is as follows. During the first part of the upward (working) stroke of the piston 17, the pump inlet 19 and outlet 21 are closed; as the piston continues to move, the increase in pressure in the working space 26 is transmitted by the diaphragm to the gas in the space 28, until the piston reaches top dead centre, when the annular groove 22 registers with the outlet port 21, allowing the energy stored in the gas in space 28 to expel fluid through the oulet. The piston is returned to bottom dead centre by its return springs and in this position more fluid is admitted to the pump through the pump inlet 19, which is connected to a suitable reservoir (not shown).

If the strut inlet port 7 had been closed, the fluid in the working space of the pump would have been trapped in the pump and would simply have reciprocated with the piston and the diaphragm. In other words, the energy applied to the pump would simply serve to move the trapped fluid to and fro and maintain the pressure thereon. The pump will be seen to be capable of storing a quantity of pressurised fluid in the working space 26 for any period of a working stroke during which the strut inlet port 7 is closed, the delivery of the pump in any working stroke will be capable of varying automatically between zero and a maximum value, according to the requirements of the strut.

If the strut outlet port 11 had been open, then at the end of the last described sequence of events, when the piston 17 returned to bottom dead centre position it would have connected the pump inlet and outlet together thereby allowing excess fluid to pass from the strut to the reservoir.

In the alternative form of pump shown in FIGURES 2 and 3, the piston 17 slides through an annular chamber 31, with which the radial bore 23 are in register throughout the working stroke of the piston. The chamber 31 is in turn in permanent communication with an annular recess 32, leading to the pump outlet port 33, which is provided with a non-return valve 34. The inlet ports 19 of the pump body communicate with the interior of a housing 36, from which a passage (not shown) leads to an arcuate chamber 37 and the pump inlet 38. The pump body is surrounded by a cup 39 normally urged against the end of the body by a coil compression spring 41. Within the bore of the pump body, there is a plunger 42 which bears against the end of the cup and is urged apart from the piston 17 by a light spring 42.

In operation of this pump, the initial part of the working stroke of the piston 17 closes the inlet port 19, whereafter fluid is expelled under pressure through the outlet, unless the strut inlet port is closed, in which case the spring 41 is compressed to store the energy of the working stroke, this energy being given up on the return stroke.

In the pump shown in FIGURE 4, the piston 17 is actuated by a spring loaded tappet 46, and the piston bears against or is attached to the diaphragm 27 and is free to separate from the tappet 46. The inlet of the pump is provided with a non-return valve 47, but otherwise the inlet and the outlet 33 are permanently in communication with the working space 26 of the pump. With this arrangement, when the working space 26 is full of fluid under pressure and no fluid is being delivered by the pump, diaphragm 27 remains stationary and the tappet 46 is reciprocated idly by the eccentric 16. The life of the diaphragm 27 is thus considerably prolonged and the rubbing load between the eccentric and the tappet is much reduced.

It will be apparent that with the pump unit illustrated in FIGURES 2 to 4, it will be necessary to provide a second pipe, separated from and additional to the pipe 14 of FIGURE 1, the second pipe being connected to the reservoir (not shown) which is also connected to the pump inlet 19. At its other end, the second pipe is connected on the outlet side of the one-way valve 12.

Many variations and modifications will of course be possible within the scope of the invention as defined in the appended claims. For example, the gas springs described in the pumps shown in FIGURES 1 and 4 could be replaced by mechanical springs, and a pump of a construction generally similar to that of FIGURES 2 and 3 could have a gas spring in place of its mechanical spring 41.

It will be appreciated that a single pump can serve a plurality of suspension struts, all of which will be connected directly to the pump inlet. Also, although it is preferred to provide the, or each, strut with its own valve means, it would be possible to arrange for a single valve means to control the flow of fluid to and from two or more struts.

We claim:

1. A suspension system including a suspension strut provided with inlet and outlet ports and associated valve means normally positioned to close both said ports, the valve means being moved to open the inlet port when the strut is compressed to a predetermined extent, and to open the outlet port when the strut is extended to a predetermined extent; and an independent pump connected to the said inlet for supplying fluid to the strut, the said pump being adapted to store a quantity of pressurised fluid for any period of a working stroke during which the said inlet port is closed.

2. A suspension system according to claim 1, wherein the said pump is a reciprocating piston pump having a working chamber which is closed by a movable end wall and resilient means for opposing movement of the end wall under the action of the piston and for storing the energy of the piston.

3. A suspension system according to claim 2, wherein the pump has a body provided with an inlet connected to a supply of fluid, and an outlet connected to the said inlet port of the strut, the pump piston being adapted to act as a valve which closes the pump inlet in the initial part of the working stroke of the piston and opens the pump outlet at the end of the working stroke.

4. A suspension system according to claim 3, wherein the said pump outlet is connected also to the said outlet port of the strut, and the pump piston is adapted to connect together the pump inlet and outlet at the end of a return stroke of the piston.

5. A suspension system according to claim 2, wherein the pump has a body provided with an inlet connected to a supply of fluid, and an outlet which is permanently connected with the working space of the pump, a non-return valve being provided in the said outlet, the piston of the pump being adapted to act as a valve which closes the pump outlet during the initial part of the working stroke of the piston.

No references cited.

ARTHUR L. LA POINT, *Primary Examiner.*

R. M. WOHLFARTH, *Assistant Examiner.*